United States Patent [19]

Inoue et al.

[11] Patent Number: 4,623,932

[45] Date of Patent: Nov. 18, 1986

[54] VIDEO CAMERA HAVING AN AUTOMATIC FOCUSING SYSTEM

[75] Inventors: Yuzuru Inoue, Machida; Takashi Shinozaki, Yokohama, both of Japan

[73] Assignee: Victor Company of Japan, Ltd., Kanagawa, Japan

[21] Appl. No.: 625,318

[22] Filed: Jun. 25, 1984

[30] Foreign Application Priority Data

Jul. 1, 1983 [JP] Japan .................. 58-119525

[51] Int. Cl.⁴ ............................................. H04N 5/38
[52] U.S. Cl. .................... 358/227; 350/172; 354/479
[58] Field of Search .............. 358/227, 224, 225, 226, 358/55, 228; 250/578, 204; 354/406, 407, 164, 166, 200, 221, 201, 195.1, 195.12, 199, 479, 476, 478; 352/141; 350/172

[56] References Cited

U.S. PATENT DOCUMENTS

| | | | |
|---|---|---|---|
| 3,062,102 | 11/1962 | Martin | 354/221 |
| 3,673,932 | 7/1972 | Rottmiller | 350/172 |
| 4,180,309 | 12/1979 | Miyata et al. | 354/25 |
| 4,259,688 | 3/1981 | Tokuhara et al. | 358/107 |
| 4,408,853 | 10/1983 | Tokutomi et al. | 354/25 |
| 4,474,446 | 10/1984 | Reynolds et al. | 354/402 |
| 4,481,413 | 11/1984 | Wilwerding | 250/204 |

*Primary Examiner*—Robert G. Lev
*Attorney, Agent, or Firm*—Ladas & Parry

[57] ABSTRACT

A video camera comprises a camera tube, a main optical system including a focusing lens, an afocal system, and a master lens, for directing external light towards the camera tube, an automatic focusing system having a sensor which obtains a focusing information responsive to an incoming light to the sensor, for carrying out an automatic focusing by displacing the focusing lens responsive to the focusing information, a first light separator for reflecting and separating a portion of light passing through the afocal system within the main optical system, a second light separator for reflecting and separating only a portion of the separated light which is separated by the first separator and is required for a detection of the sensor of the automatic focusing system, and for directing the separated light which is separated by the second light separator towards the sensor as the incoming light, and an optical type viewfinder for receiving a light portion which is among the separated light which is separated by the first separator and excludes the separated light which is separated by the second separator.

6 Claims, 3 Drawing Figures

VIDEO CAMERA HAVING AN AUTOMATIC FOCUSING SYSTEM

BACKGROUND OF THE INVENTION

The present invention generally relates to video cameras having an automatic focusing system, and more particularly to a video camera which has an automatic focusing system and is further provided with an optical type viewfinder.

Generally, there is a video camera having an automatic focusing system for automatically focusing on an object which is to be picked up. As is well known, there are various types of automatic focusing systems, such as the infrared type, the ultrasonic type, and the optical type which uses a part of the light from the object as the focusing information. These various types of automatic focusing systems have the known advantages and disadvantages, but recently, the optical type automatic focusing system is employed more frequently. In the present specification, the term "automatic focusing system" refers to the optical type automatic focusing system.

The video camera having the automatic focusing system, is designed so that a part of the light from the object is separated from a main optical system which directs the light from the object to a camera tube, and this separated light is supplied to the automatic focusing system as the focusing information. Accordingly, the quantity of light which reaches the camera tube, is reduced by the quantity of light which is separated from the main optical system for use as the focusing information. In order to be able to satisfactorily pick up the image of the object even under a dark condition, the quantity of light reaching the camera tube should be large, but on the other hand, the quantity of light separated from the main optical system should be large to a certain extent so as to obtain a positive focusing information for use in the automatic focusing system. Hence, 70% of the incoming light to the main optical system from the object is conventionally supplied to the camera tube, and the remaining 30% of the incoming light is supplied to the automatic focusing system.

The video camera is provided with a viewfinder, so that the operator can view the object through the viewfinder and determine the framework of the picture.

As one type of the viewfinder, there is the electronic or electric type viewfinder. This electronic viewfinder has a compact cathode-ray tube (CRT), and a video signal related to the image which is picked up by the camera tube is also supplied to the CRT so that the reproduced picture can be monitored. Since this viewfinder is not the optical type and does not use light, the quantity of light reaching the camera tube and the automatic focusing system will not be reduced when this viewfinder is applied to the video camera having the automatic focusing system. However, this type of viewfinder uses the CRT, and for this reason, the cost of the viewfinder is high and the power consumption of the viewfinder is large. Further, a black-and-white CRT is generally employed for the viewfinder, and it is impossible to check the state of the color. When a color CRT is employed for the viewfinder, the cost of the viewfinder becomes even higher. In addition, because the picture on the compact CRT is viewed through a magnifying lens, the scanning lines are conspicuous and the picture is unclear.

On the other hand, there is a video camera which is provided with another optical system in addition to the main optical system for directing the light from the object to the camera tube. The image of the object is obtained in the viewfinder by passing the light from the object through this other optical system. The disadvantages described before are eliminated according to this video camera, however, a gap is formed between an objective lens of this other optical system which obtains the image in the viewfinder and an objective lens of the main optical system which directs the light to the camera tube. As a result, a parallax occurs due to the gap.

There is also a video camera which employs the so-called through-the-lens (TTL) type viewfinder. In the TTL type viewfinder, a part of the light from the object is separated from the main optical system which directs the light from the object to the camera tube, and this separated light is supplied to the viewfinder system. However, this TTL type viewfinder uses a part of the light reaching the camera tube. Hence, when this TTL type viewfinder is applied to the video camera having the automatic focusing system of the type described before, the quantities of light reaching the TTL type viewfinder, the camera tube, and the automatic focusing system become greatly reduced. Therefore, conventionally, there was no concept of providing the TTL type viewfinder and the automatic focusing system in the video camera.

SUMMARY OF THE INVENTION

Accordingly, it is a general object of the present invention to provide a novel and useful video camera having an automatic focusing system, in which the disadvantages described heretofore have been overcome.

Another and more specific object of the present invention is to provide a video camera in which a part of the light from an object which is to be picked up, is separated from a main optical system which directs the light from the object to a camera tube, and this separated light is supplied to an automatic focusing system as the focusing information and also to an optical type viewfinder.

Still another object of the present invention is to provide a video camera which is designed to obtain the light which is to be supplied to the automatic focusing system as the focusing information, in a form of a flux of light having a shape required for the detection of the focusing information. According to the video camera of the present invention, only a light portion having the shape required for the detection of the focusing information, is directed towards the automatic focusing system. Hence, it is possible to positively detect the focusing information with a light quantity which is smaller than the light quantity conventionally required for the detection. Thus, even when both the optical type viewfinder and the automatic focusing system are provided in the video camera, all of the remaining light which is not used for the detection can be directed towards the optical type viewfinder, and it is possible to monitor a satisfactory image in the optical viewfinder. In addition, when the present invention is applied to a video camera not having the optical type viewfinder, all of the remaining light which is not used for the detection can be directed towards the camera tube, and it is possible to pick up an image satisfactorily even under a dark condition.

Other objects and further features of the present invention will be apparent from the following detailed

DETAILED DESCRIPTION

Figure 1:
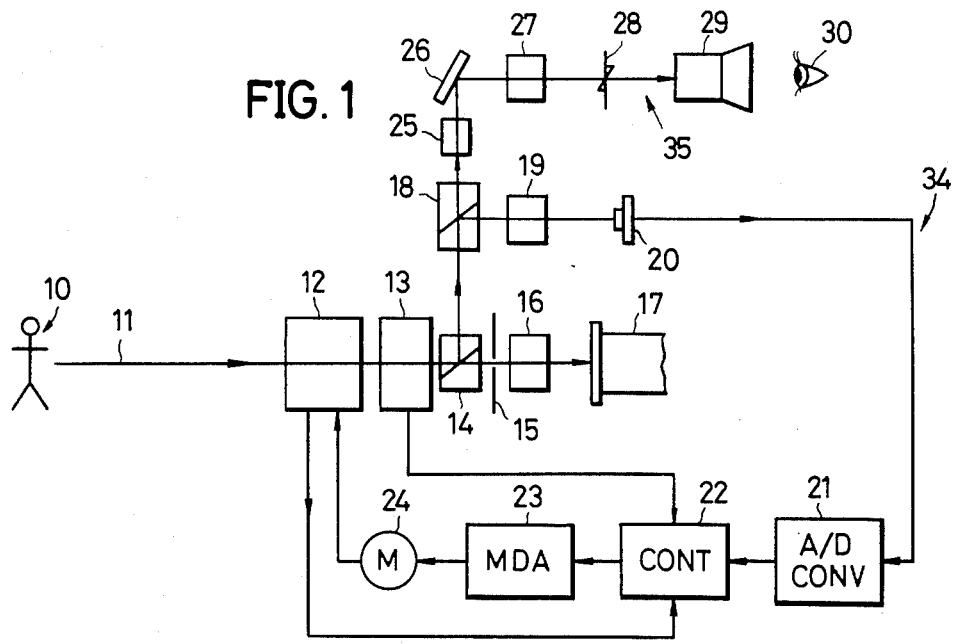
FIG. 1 generally shows an optical system of an embodiment of a video camera according to the present invention together with a part of an electrical system.

In FIG. 1, a light 11 from an object 10 which is to be picked up, passes through a focusing lens 12 and a zoom lens 13 of a video camera, and reaches a prism 14 having a semi-transparent mirror surface. A portion (a quantity of light in the order of 30%) of the light reaching the prism 14, is reflected by the semi-transparent mirror surface of the prism 14 and is directed towards a mirror prism 18 which will be described later on in the specification. A remaining portion (a quantity of light in the order of 70%) of the light reaching the prism 14, is transmitted through the semi-transparent mirror surface of the prism 14. The prism 14 comprises a pair of prism elements which are put together so that a meeting surface of one prism element meets a meeting surface of the other prism element. The semi-transparent mirror surface is formed by vapor deposition on the meeting surface of one of the prism elements. Since the pair of prism elements are put together, the prism 14 does not have the original spectral functions of the prism elements, and is simply a cubic glass body having the semi-transparent mirror surface disposed obliquely within the glass body. In the present specification, the prism 14 is employed as an example only. Any element having the semi-transparent mirror surface may be employed for the prism 14, and the element need not be in the form of a prism. The light transmitted through the prism 14, passes through an iris 15 and a master lens 16, and reaches a photoelectric surface of a camera tube 17.

In FIG. 1, only the light on the optical axis is shown as a line for convenience' sake, instead of illustrating the light as a flux of light. An afocal system for parallel ray of light is arranged between the zoom lens and the master lens 16, and the prism 14 described before is arranged within this afocal system.

Figure 2:
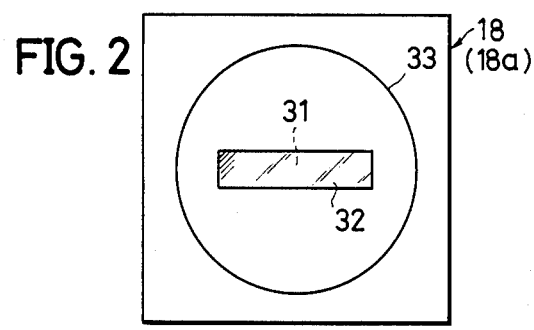
FIG. 2 is a diagram for explaining a light reflecting part of a mirror prism shown in FIG. 1.

The light reflected by the prism 14, reaches the mirror prism 18 which constitutes an essential part of the present invention. As shown in FIG. 2, the mirror prism 18 has a non-transparent mirror part 32. The mirror part 32 has an elongated rectangular shape, and extends horizontally to the right and left about an optical axis 31. The mirror part 32 reflects virtually all (100%) of the light impinging thereto. The mirror prism 18 comprises a pair of prism elements which are put together so that a meeting surface of one prism element meets a meeting surface of the other prism element. The mirror part 32 having the elongated rectangular shape, is formed by vapor deposition on the meeting surface of one of the prism elements. Since the pair of prism elements are put together, the mirror prism 18 does not have the original spectral functions of the prism elements, and is simply a cubic glass body having the mirror part 32 disposed obliquely within the glass body so that the center of the mirror part 32 coincides with the optical axis 31. Accordingly, among a flux of light 33 which reach the prism 18 from the prism 14, the light corresponding to the mirror part 32 are reflected. The light reflected by the mirror prism 18 is passed through an automatic focusing lens 19, and are subjected to an image formation in an automatic focusing sensor 20.

For example, a sensor having a known construction (such as a TCL sensor manufactured by Honeywell of the United States) may be used for the sensor 20. The sensor having the known construction may have 24 small lenses contiguously arranged horizontally to the right and left in a row, and a pair of charge coupled devices (CCDs) arranged horizontally to the right and left of each of the small lenses as sensor elements, so as to obtain the focusing information by detecting the light which passes the right and left ends of each of the small lenses. As described before, the mirror prism 18 only reflects the rectangular light portion corresponding to row of sensor elements in the sensor 20, by the mirror part 32 thereof, and directs the reflected light towards the sensor 20. Thus, only the light portion which is required for the detection of the focusing information in the sensor 20, is effectively directed towards the sensor 20.

A detection output of the sensor 20 is supplied to a control part 22 as a focusing information signal, through an analog-to-digital (A/D) converter 21. The control part 22 is constituted by a micro-computer, for example, and receives the optical information from the focusing lens 12 and the optical information from the zoom lens 13. The control part 22 compares these information from the lenses 12 and 13, with the focusing information signal from the A/D converter 21. An output of the control part 22 is applied to a focusing drive motor 24 through a motor driving amplifier 23. When the focal point of the focusing lens 12 is out of the focused range, a signal is supplied to the focusing drive motor 24 from the control part 22 so as to move the focusing lens 12 and obtained the correct focus. The construction of an automatic focusing system 34 itself, including the automatic focusing lens 19, the sensor 20, the A/D converter 21, the control part 22, the driving amplifier 23, the focusing drive motor 24, the focusing lens 12, and the zoom lens 13, is known.

The light reflected by the mirror part 32 of the mirror prism 18, is sufficient as a minimum optical information which is required for the detection in the sensor 20. When the entire flux of light 33 is reflected by the mirror part 32 of the mirror prism 18 and is directed towards the sensor 20, light which are not required for the detection in the sensor 20 will reach the automatic focusing sensor, and the light will be used inefficiently. Accordingly, in the video camera of the present invention, among the flux of light 33 which reaches the mirror prism 18, only the light which is required for the detection in the sensor 20 is reflected by the mirror part 32.

Among the flux of light 33 which reaches the mirror prism 18, a light part other than the light part which is reflected by the mirror part 32, is transmitted through the mirror prism 18. The light transmitted through the mirror prism 18 passes through a finder lens 25, and is reflected by a mirror 26. The light reflected by the mirror 26, reaches an eyepiece lens 29 through a focal plate 28. The image in the viewfinder is monitored by an eye 30 of the operator, through the eyepiece lens 29. A view-finder 35 includes the mirror 26, the lenses 25 and 27, the focal plate 28, and the eyepiece lens 29, and separates a part of the light from the main optical system which reaches the camera tube 17 from the focusing lens 12. This viewfinder 35 itself is generally known as the TTL viewfinder.

The light transmitted through the mirror prism 18, is the light other than the light corresponding to the mirror part 32. Even when the light corresponding to the mirror part 32 is excluded, only the quantity of light reaching the eyepiece lens 29 is reduced by a quantity corresponding to the excluded light, and the image which is obtained by the image formation is unaffected by the exclusion of the light corresponding to the mirror part 32.

As described heretofore, among the light reflected by the prism 14, only the light (minimum optical information) required for the detection in the sensor 20 is reflected by the mirror prism 18 and is used as the focusing information. The remaining light which is reflected by the prism 14 is transmitted through the mirror prism 18 and reach the viewfinder 35. Accordingly, the quantity of light reaching the viewfinder 35 is less than the quantity of light reflected by the prism 14, by a quantity of light which is reflected by the mirror part 32 of the mirror prism 18 and reaches the automatic focusing system 34.

However, the quantity of light reaching the automatic focusing system 34 is not large, because the light reaching the automatic focusing system 34 is the light which is required for the detection in the sensor 20 and is reflected by the mirror part 32 having a small area. Therefore, the quantity of light excluding the light portion corresponding to the mirror part 32, which is transmitted through the mirror prism 18, is sufficiently large for the purpose of satisfactorily monitoring the image of the object in the viewfinder 35 by the eye 30.

A concrete example of the mirror prism 18 will now be described. The mirror part 32 of the mirror prism 18 has a reflectivity approximately equal to 100%. The vertical length of the mirror part 32 is approximately 1/5 the diameter D of the flux of light 33, and the horizontal length of the mirror part 32 is approximately $\frac{2}{3}$ the diameter D. Accordingly, the percentage of the area of the mirror part 32 with respect to the cross sectional area of the flux of light 33, is approximately equal to 17%. This means that approximately 17% of the light reaching the mirror prism 18 is directed towards the automatic focusing system 31, and the remaining 83% of the light reaching the mirror prism 18 is directed towards the viewfinder 35. Hence, when it is assumed that the quantity of light separated by the prism 14 is approximately equal to 30% of the total quantity of light reaching the prism 14, the percentage of the quantity of light directed towards the automatic focusing system 34 with respect to the total quantity of light reaching the prism 14, is approximately equal to 5%. By selecting the shape of the mirror part 32 as described heretofore and selecting the reflectivity of the mirror part 32 to a high value, it is possible to positively obtain the focusing information, although the percentage of the quantity of light directed towards the automatic focusing system 34 with respect to the total quantity of light reaching the prism 14 is in the range of 5%. The percentage of the quantity of light reaching the viewfinder 35 with respect to the total quantity of light reaching the prism 14, is approximately equal to 25%. This percentage of approximately 25% is slightly lower than the percentage of approximately 30% which is conventionally obtained, however, it is possible to satisfactorily monitor the image of the object in the view finder 35 with virtually no inconveniences from the practical point of view.

According to the video camera of the present invention, only the light portion which is required as the focusing information in the automatic focusing system 34, is directed towards the sensor 20 in the automatic focusing system 34. The other light portions are all directed towards the viewfinder 35. For this reason, the automatic focusing system 34 can be operated positively. Further, it is possible to realize an inexpensive video camera which has the TTL viewfinder, does not introduce parallax, has a low power consumption, and enables monitoring of a satisfactory color image of the object in the viewfinder.

The quantity of light separated by the mirror prism 18, is not limited to the example described before, and may differ according to the specification of the given video camera. In any case, it is possible to detect the focusing information for the automatic focusing system 34 and to satisfactorily monitor the image of the object in the viewfinder 35, without reducing the quantity of light transmitted towards the camera tube 17 as compared to the conventional case.

The mirror part 32 has an elongated rectangular shape which is elongated in the horizontal direction. However, the mirror part 32 has this elongated rectangular shape depending on the arrangement of the sensor 20, thus the shape of the mirror part 32 is not limited to this elongated rectangular shape. For example, the mirror part 32 may have a shape which is long in an oblique direction or a vertical direction, depending on the particular arrangement of the sensor 20.

The mirror prism 18 may be applied to a video camera which does not employ the TTL viewfinder but employs a CRT viewfinder or a viewfinder using another optical system. In this case, the disadvantages of the viewfinder described before will not be eliminated, however, as will be described hereinafter, it is possible to increase the quantity of light reaching the camera tube 17. An embodiment having such a feature is shown in FIG. 3.

Figure 3:
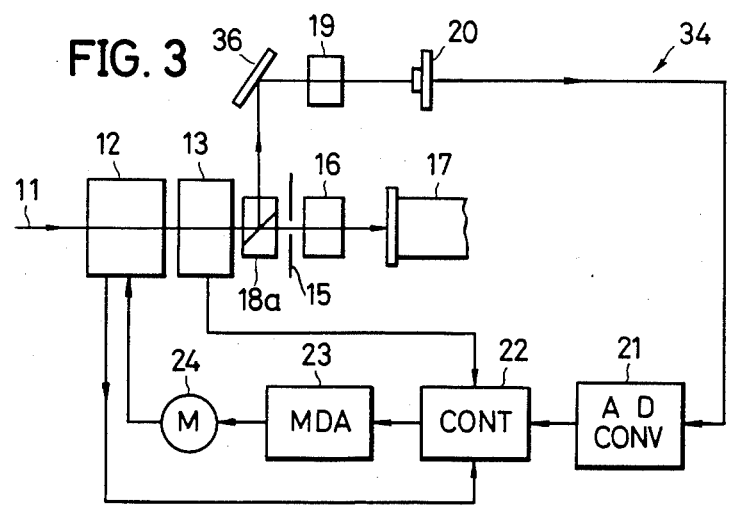
FIG. 3 generally shows an optical system of another embodiment of a video camera according to the present invention together with a part of an electrical system.

In FIG. 3, those parts which are the same as those corresponding parts in FIG. 1 are designated by the same reference numerals, and their description will be omitted. In the present embodiment, a mirror prism 18a similar to the mirror prism 18 described in conjunction with FIGS. 1 and 2, is used. This mirror prism 18a is provided between the zoom lens 13 and the master lens 16, instead of the prism 14. Among the light passing through the zoom lens and reaching the mirror prism 18a, the light corresponding to the mirror part 32 of the mirror prism 18a is reflected by the mirror part 32. The light which is reflected by the mirror part 32 is further reflected by a mirror 36, passes through the lens 19, and reaches the sensor 20. The light other than the light corresponding to the mirror part 32, is transmitted through the mirror prism 18a, and reaches the camera tube 17 through the master lens 16.

According to the present embodiment, only the light portion which is required as the focusing information in the automatic focusing system 34, is separated from the main optical system reaching the camera tube 17. For this reason, the quantity of light reaching the camera tube 17 is large, and it is possible to satisfactorily pickup the image of the object under a dark condition.

In the present embodiment, the reflectivity of the mirror part 32 of the mirror prism 18a is higher than the reflectivity of the mirror prism 14, but may be less than 100%.

Further, the present invention is not limited to these embodiments, but various variations and modifications may be made without departing from the scope of the present invention.

What is claimed is:

1. A video camera comprising:
    a camera tube;
    a main optical system including a focusing lens and a master lens, for directing an external incident light towards said camera tube along a first light path;
    an automatic focusing system having a sensor which obtains a focusing information responsive to an incoming light to said sensor, for carrying out an automatic focusing by displacing said focusing lens responsive to the focusing information;
    light separating means arranged in said first light path for reflectively separating a first portion of said external incident light as a separated light which travels along a second light path;
    mirror prism means comprising a pair of prism elements which are put together so that a meeting surface of one prism element meets a meeting surface of the other prism element, one of said meeting surfaces being provided with a mirror part which has an elongated rectangular shape and an area which is smaller than said one meeting surface, said prism mirror means being arranged in said second light path so that said mirror part reflects and directs a second portion of said separated light towards said sensor, said second portion of said separated light travelling along a third light path; and
    an optical type viewfinder arranged in said second light path for receiving a remainder of said separated light after said second portion is separated from said separated light by said mirror prism means, said external incident light continuously and simultaneously reaching said camera tube, said sensor and said optical type viewfinder along said first, second and third light paths, respectively.

2. A video camera as claimed in claim 1 in which said mirror prism means transmits light at parts other than said mirror part thereof.

3. A video camera as claimed in claim 1 in which said mirror part is non-transparent and has a reflectivity to close to 100%.

4. A video camera as claimed in claim 1 in which said mirror part has a shape elongated in a horizontal direction.

5. A video camera as claimed in claim 1 in which said mirror part of said mirror prism means reflects only a light portion which is required by said sensor for obtaining said focussing information.

6. A video camera as claimed in claim 1 in which said mirror part of said mirror prism means reflects only a light portion which is required by said sensor for obtaining said focusing information.

* * * * *